United States Patent [19]

Pierce

[11] Patent Number: 5,131,902
[45] Date of Patent: Jul. 21, 1992

[54] NONSYNCHRONOUS FIVE-SPEED TRANSAXLE FOR AUTOMOTIVE VEHICLES

[75] Inventor: Stanley L. Pierce, Northville, Mich.

[73] Assignee: Ford Motor Company, Dearborn, Mich.

[21] Appl. No.: 755,939

[22] Filed: Sep. 6, 1991

[51] Int. Cl.⁵ .............................................. F16H 3/62
[52] U.S. Cl. ...................................................... 475/281
[58] Field of Search .............................. 475/281, 280

[56] References Cited

U.S. PATENT DOCUMENTS

| | | | |
|---|---|---|---|
| 3,523,468 | 8/1970 | Kepner | 475/281 |
| 3,705,521 | 12/1972 | Smith | 475/281 |
| 3,811,343 | 5/1974 | Mori et al. | 475/281 X |
| 3,862,581 | 1/1975 | O'Malley | 475/281 |
| 3,946,622 | 3/1976 | Murakami et al. | 475/281 X |
| 4,086,827 | 5/1978 | Chana | 74/759 |
| 4,368,649 | 1/1983 | Vahratian et al. | 74/695 |
| 4,418,585 | 12/1983 | Pierce | 74/695 |
| 4,509,389 | 4/1985 | Vahratian et al. | 74/695 |
| 4,653,347 | 3/1987 | Hiraiwa | 475/281 X |

FOREIGN PATENT DOCUMENTS

| | | | |
|---|---|---|---|
| 52-50458 | 4/1977 | Japan | 475/281 |
| 2-35243 | 2/1990 | Japan | 475/280 |
| 7411078 | 2/1975 | Netherlands | 475/281 |
| 2107008 | 4/1983 | United Kingdom | 475/280 |

OTHER PUBLICATIONS

U.S.Ser. No. 739,641 filed Aug. 2, 1991–Pierce.

*Primary Examiner*—Rodney H. Bonck
*Assistant Examiner*—Ryan W. Massey
*Attorney, Agent, or Firm*—Frank G. McKenzie; Roger L. May

[57] ABSTRACT

A transaxle for use in an automotive vehicle driveline includes a torque converter and a compound planetary gear system having three simple planetary gear units adapted to provide five forward driving torque delivery paths, the two highest speed ratios being overdrive, the axis of the torque converter being located on the crankshaft axis of the vehicle engine, and a torque output shaft being parallel to the torque converter and engine axis. Hydraulically actuated friction clutches and brakes and one-way couplings interconnect the input and output of the transmission to members of the planetary gearing and the transmission casing. A final drive planetary gearset, driven by the output of the planetary gear units, drives a differential mechanism connected to the axle shaft of the vehicle.

15 Claims, 6 Drawing Sheets

| GEAR | CC | 4B | DC | 5B | RC | FC | 2B | L/R | DRIVE OWC4 | DRIVE OWC3 | DRIVE OWC2 | DRIVE OWC1 | COAST OWC4 | COAST OWC3 | COAST OWC2 | COAST OWC1 |
|---|---|---|---|---|---|---|---|---|---|---|---|---|---|---|---|---|
| 1M | X |   |   |   |   |   |   | X |   |   |   |   |   |   |   |   |
| 1 | X |   |   |   |   | X |   |   |   |   | X | X |   |   | O/R | O/R |
| 2M | X | X |   |   |   | X | X |   | X |   | X | X |   |   |   | O/R |
| 2 |   | X |   |   |   | X | X |   | X |   | X | O/R |   |   | O/R | O/R |
| 3M | X |   | X |   |   | X | X |   | O/R |   | X | O/R |   | X | O/R | O/R |
| 3 |   |   | X |   |   | X | X |   | O/R |   | X | O/R |   |   | O/R | O/R |
| 4M |   | X | X |   |   | X |   |   |   | X | X | O/R | X |   | O/R | O/R |
| 4 |   | X | X |   |   | X |   |   |   | X | O/R | O/R | O/R | O/R | O/R | O/R |
| 5 |   |   |   | X |   |   |   |   |   | O/R | O/R | O/R | O/R | O/R | O/R | O/R |
| R |   |   |   |   | X |   |   | X | X |   |   |   | O/R |   |   |   |

NONSYNCHRONOUS FIVE-SPEED TRANSAXLE FOR AUTOMOTIVE VEHICLES

BACKGROUND OF THE INVENTION

1. Field of the Invention

This invention relates to planetary gearing, clutches and brakes for an automatic transmission used in motor vehicles. The invention pertains, more particularly, to a transaxle having two planetary gear units that produce two overdrive speeds, direct drive, and two underdrive speeds.

2. Description of the Prior Art

Various arrangements of clutches, brakes and one-way clutches are used in the prior art to control operation of dual interconnected planetary gear units to produce forward speed ratios and a reverse drive ratio in an automatic transmission.

U.S. Pat. No. 4,418,585 has clutches and brakes arranged so that a gear ratio change from the lowest speed to the second speed is made nonsynchronously, i.e., by transferring torque from an overrunning coupling to a friction clutch. In that transmission, a gear shift from the second speed to the third speed requires disengagement of the brake band and application of a clutch. A gear ratio change from the third speed to the fourth or overdrive speed also requires disengagement of a brake band and engagement of a friction clutch. In the operation of the transmission, none of the gear shifts require synchronous disengagement of a clutch and engagement of another clutch. Therefore, timing problems in the engagement and release of the clutch brake control servos are eliminated.

The transmission according to the '585 patent requires time for disengagement of a high speed ratio clutch and application of a friction brake in order to produce the ratio change from the third forward speed to the fourth overdrive speed.

U.S. Pat. No. 4,368,649 describes a four-speed transaxle that overcomes this difficulty. In the transaxle of the '649 patent the gear shift from the third speed to the fourth speed results by applying a single friction brake in addition to the other friction elements engaged during the third speed ratio. A gear shift from the first speed to the second forward speed results merely by engaging a second friction clutch while a companion friction clutch remains applied. In this way, a ratio change from the first ratio and from the third ratio in the forward driving speed range results merely by engaging or disengaging a single friction element, either a clutch or a brake, thereby greatly simplifying control of the clutches and eliminating potential for harsh or abrupt gear shift changes.

U.S. Pat. No. 4,509,389 describes a further improvement that eliminates a latent difficulty in control of the transmission of the '649 patent that makes calibration of the two-three upshift difficult. The sun gear is not connected to a friction clutch cylinder but is connected instead to the inner race of an associated one-way clutch. The inner races of each one-way coupling are connected to a common member, which operates as a torque delivery element for the input sun gear of the planetary gear. The maximum speed of the friction clutch cylinders is equal to the speed of the driven sprocket of a chain mechanism connecting the output of a torque converter to the input shaft of the transmission.

U.S. Pat. No. 4,086,827 describes a four speed transmission in which a single one-way clutch is located in series between an input friction clutch and a gear member of a planetary gear set. The one-way clutch permits the gear member to overrun the input during an overdrive ratio so that an upshift from the third speed to the fourth speed results without a synchronous release of the input friction clutch. To produce a downshift from the fourth speed to the second or third speeds, the input increases to the speed of the gear member by engagement of the one-way clutch when a friction brake or another friction clutch is released.

The present invention provides for five forward speeds and a reverse drive ratio, and is an improvement over the four speed transaxle described in U.S. Ser. No. 739,641 filed Aug. 2, 1991, assigned to the assignee of this invention.

SUMMARY OF THE INVENTION

My invention is a two-axis transaxle having a hydrokinetic torque converter mounted on an axis concentric with the engine crankshaft and parallel to the axis of the multiple speed gearing. The transaxle produces two underspeed ratios, a direct drive ratio, two overspeed ratios and a reverse drive ratio.

The automatic transaxle of this invention produces five forward speed ranges and a reverse drive. Because of the unique arrangement of the clutch, brakes and one-way couplings, the transaxle is extremely compact and its weight is low. The compactness of the transaxle is the result of use of certain components of the transaxle for multiple purposes to produce multiple speed ratios. For example, the structure that provides the gearset reaction force through a one-way coupling in intermediate speed ranges, the second and third speed ratios, is used also to transmit torque converter turbine torque in the reverse drive condition.

The torsional path between the engine and the planetary gear in the reverse drive condition is through a reverse friction clutch and a cylinder or drum that provides a surface engaged by an intermediate brake band and the friction plate of the reverse friction clutch. This use of the shell or drum for multiple purposes eliminates the need for an additional component.

A one-way coupling, located between the gear units and engine, overruns in the reverse coast condition. The engine is driveably disconnected from the wheels and therefore unavailable to impede vehicle movement. This avoids abrupt unexpected changes in acceleration when the operator changes from drive to coast conditions in the reverse range.

The transmission includes three planetary gear units each including a sun gear, a ring gear, a carrier and planetary pinions rotatably supported on the carrier and meshing with the sun gear and ring gear. The carrier of the first gear unit is fixed to the ring gear of the second gear unit and is driveably connected as the output from the gearing to the sun gear of a final drive planetary gearset that drives a differential mechanism.

The carrier of the second gear unit is connected to the ring gear of the first gear unit and to the inner race of a one-way brake fixed to the transmission casing. The sun gears of the second and third gear units are connected mutually and to two one-way couplings, each coupling fixed to a respective brake. The carrier of the third gear unit is releasably connected to a brake.

Parallel torque delivery paths between the ring gear of the first planetary gear unit and a low reverse brake drum comprise a one-way coupling and a forward clutch in parallel with a coast clutch, which provides a torque reaction that bypasses the one-way clutch during a coast condition.

The clutches and brakes of the transaxle are arranged so that the gear ratio change from the lowest speed to the second speed results by transferring torque from a one-way brake to a intermediate brake band. A gear ratio change from the second speed to the third speed results when a direct clutch is engaged and while the brake band continues to be applied. A gear ratio change from the third speed to the fourth speed results by applying an overdrive brake, a friction member, while maintaining engagement of the direct clutch. An upshift to fifth speed from fourth speed result by engaging a fifth speed brake while maintaining engaged the friction elements that produce fourth speed. Therefore, no ratio change requires synchronous disengagement of a friction element and application of another friction element. Because of this feature, timing problems in the engagement and release of friction clutches and brakes and control servos are eliminated.

DESCRIPTION OF THE PREFERRED EMBODIMENT

Figure 1:
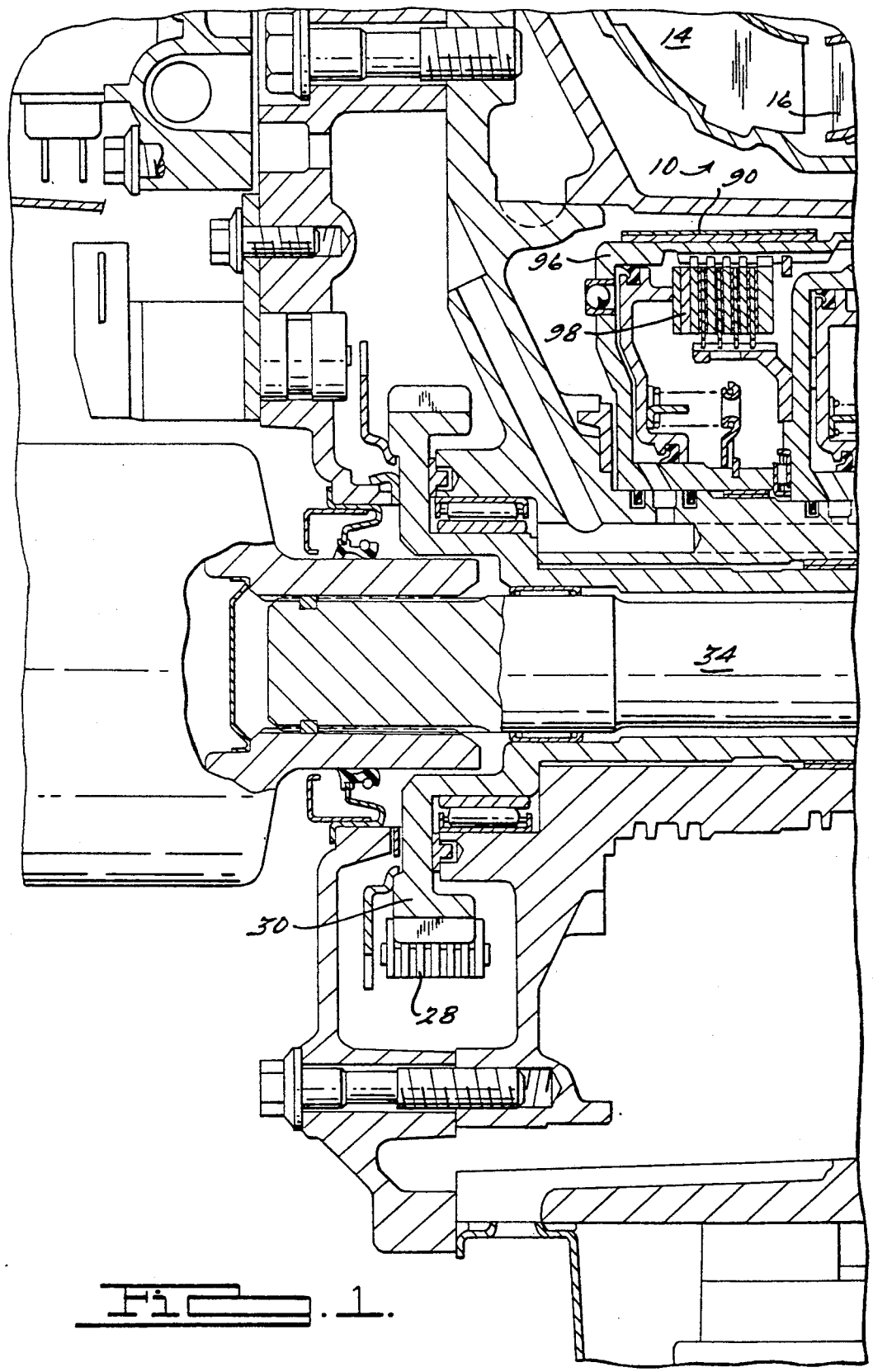
FIGS. 1-4 in combination comprise a cross section taken along the axes of the input and output shaft showing various friction clutches and brakes, and several one-way couplings used to produce multiple forward speeds and reverse drive.
Figure 2:
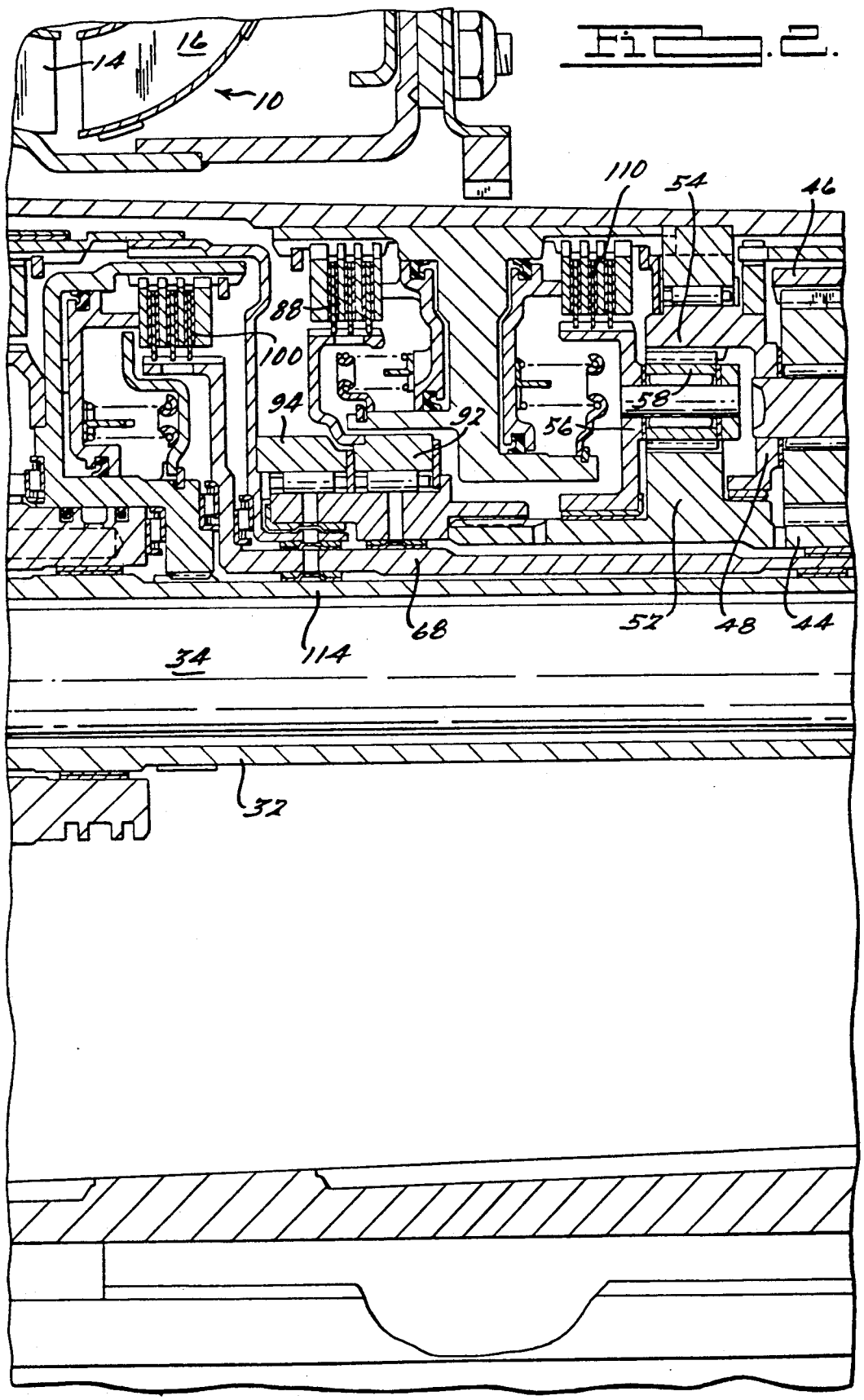
Figure 3:
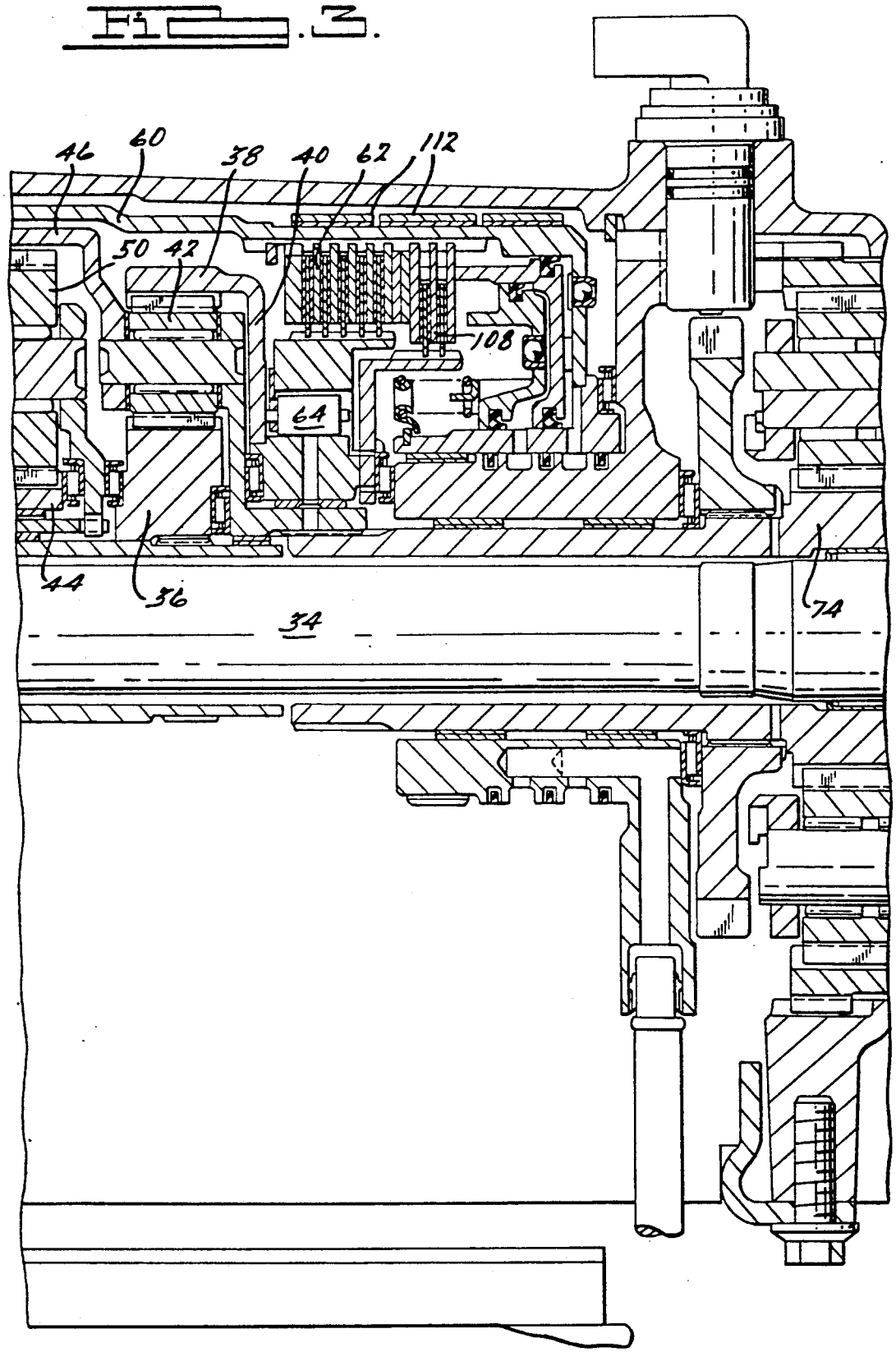
Figure 4:
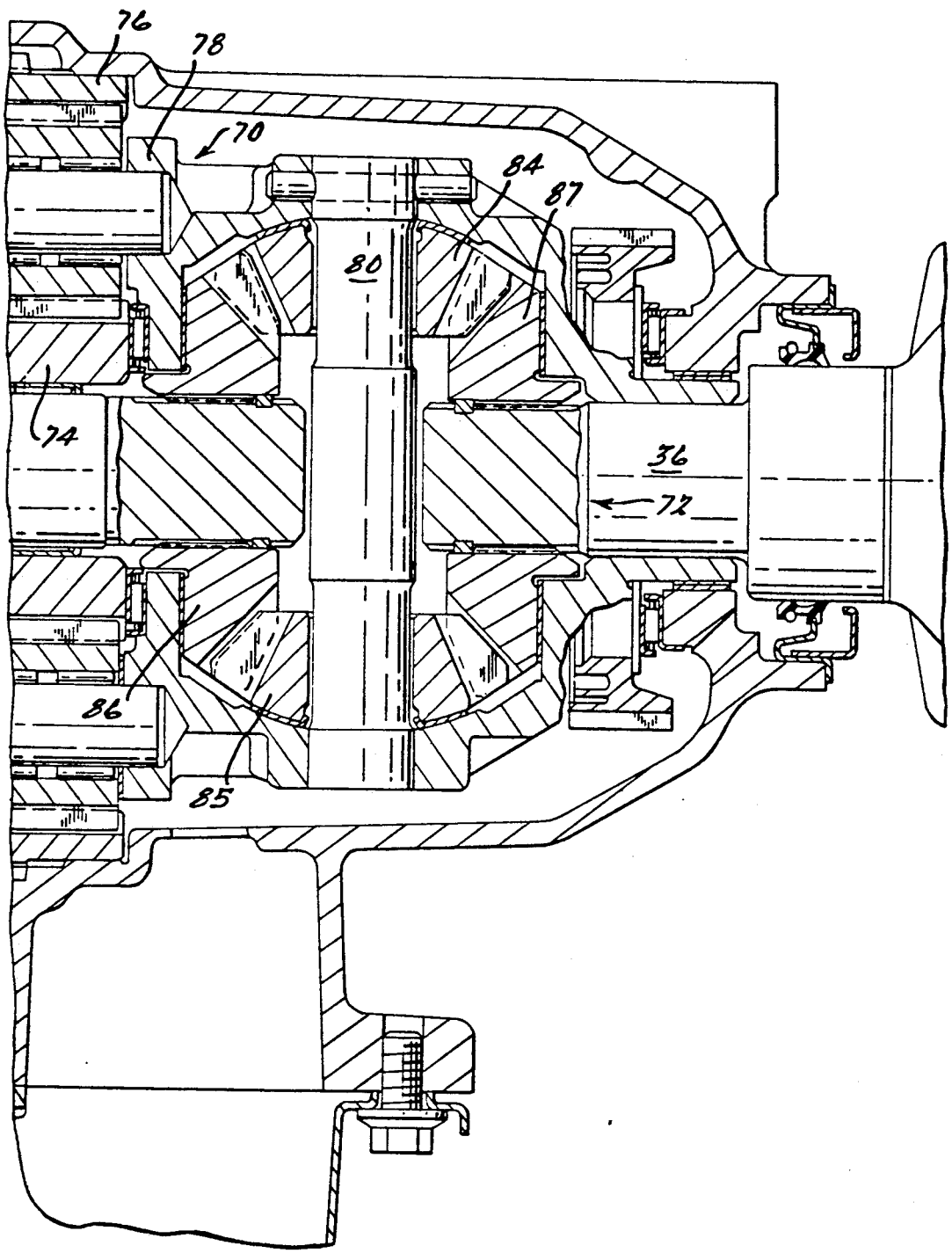
Figure 5:
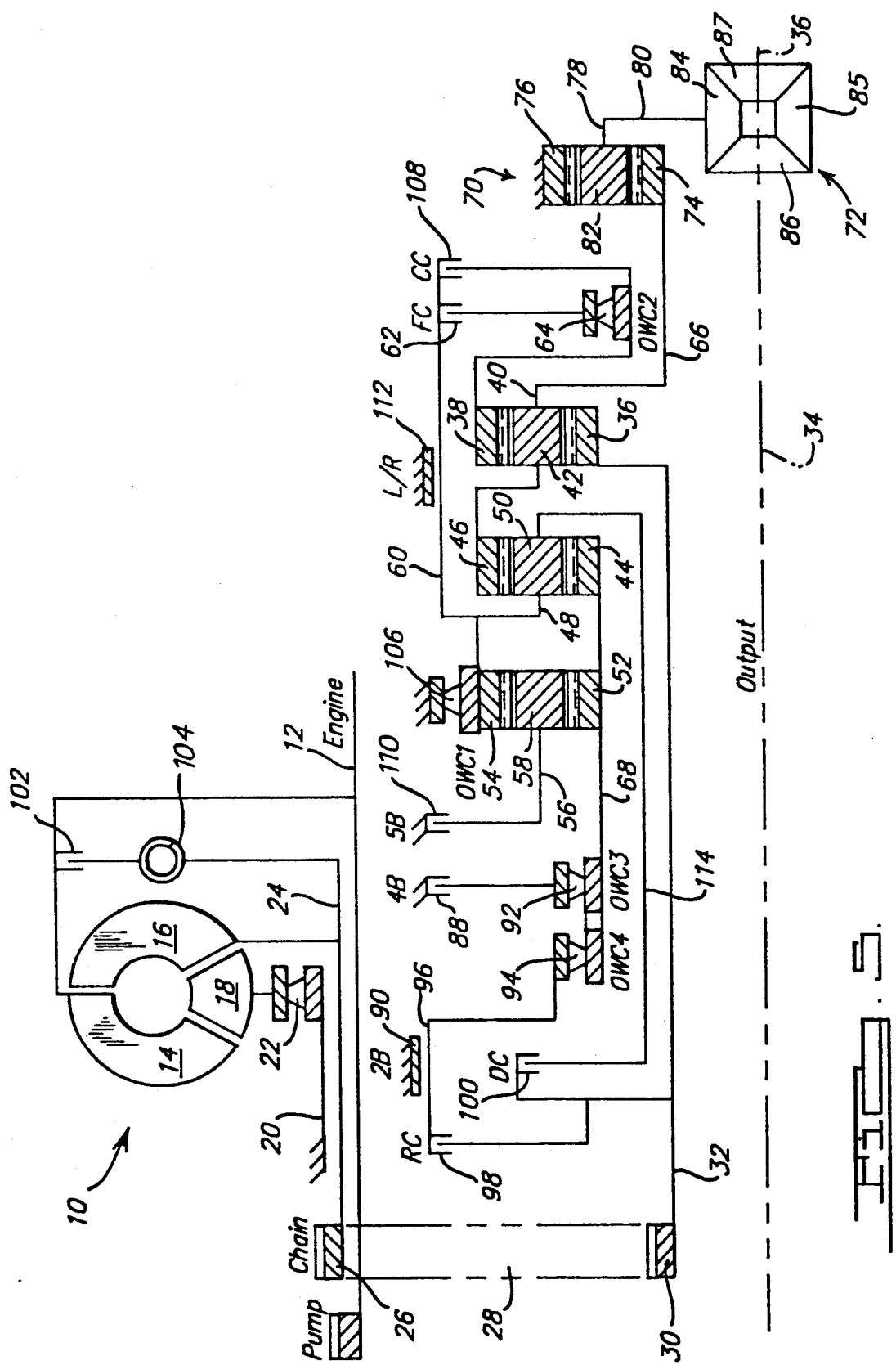
FIG. 5 is a schematic diagram showing planetary gearing, clutches, brakes, couplings, torque converter, chain drive mechanism, final gearing and a differential mechanism.

Referring first to FIGS. 1-5, a hydrokinetic torque converter 10 is driveably connected to an internal combustion engine having a crankshaft 12 connected to a bladed impeller 14 of the torque converter. A bladed turbine 16, a bladed stator 18, and the impeller 14 define a toroidal fluid flow circuit within the casing of the torque converter. The stator 18 is supported on a stationary sleeve shaft 20, and a overrunning brake 22 anchors the stator to shaft 20 to prevent rotation of stator 18 in a direction opposite to the direction of rotation of the impeller, although free-wheeling motion in the opposite direction is permitted.

Turbine 16 is connected to turbine sleeve shaft 24, which drives the torque input sprocket wheel 26. Sprocket wheel 26 is part of an input torque transfer drive that includes also drive chain 28 and driven sprocket wheel 30, which is mounted for rotation about the torque input sleeve shaft 32. Axle shafts 34, 36 are concentric with the axis of input shaft 32.

Planetary gearing includes three simple planetary gear units. The first gear unit includes a sun gear 36, ring gear 38, carrier 40 and planetary pinions 42, supported by carrier 40 in meshing engagement with sun gear 36 and ring gear 38. The second planetary gear unit includes a sun gear 44, a ring gear 46, carrier 48 and planet pinions 50, supported by carrier 48 in meshing engagement with sun gear 44 and ring gear 46. The third gear unit includes a sun gear 52, a ring gear 54, a carrier 56 and planet pinions 58, supported by carrier 56 in meshing engagement with sun gear 52 and ring gear 54. Carrier 48 and ring gear 54 are connected mutually, and they are connected to ring gear 38 by a drum 60, forward clutch 62 and a one-way coupling 64, also identified as OWC2. Ring gear 46 is connected to carrier 40 and to torque output shaft 66. Sun gears 44, 52 are connected mutually by shaft 68.

A final drive planetary gearset 70 is located in a torque delivery path between output shaft 66 and a differential gear unit 72, to which axle shafts 34 and 36 are connected. Gear unit 70 includes sun gear 74, connected to output shaft 66; ring gear 76, permanently fixed to the transmission casing; a carrier 78, connected to the spindle 80 of the differential mechanism 72; and planet pinions 82, rotatably supported on carrier 78 in engagement with sun gear 74 and ring gear 76. Differential gear unit 72 has bevel pinions 84, 85, which mesh with bevel side gears 86, 87, connected respectively to axle shafts 34, 36.

Sprocket wheel 30, connected to sleeve shaft 32, is connected directly to sun gear 36 of the first planetary gear unit. Sun gears 44, 52 of the second and third gear units are releasably connectable to the transmission casing through a one-way coupling 92 (OWC3) and a brake 88, which carries also the symbol 4B. Sun gears 44, 52 are releasably connected to the casing also through one-way coupling 94 (OWC4) and by a brake 90, which also carries the symbol 2B. The inner races of one-way couplings 92, 94 are directly connected by sleeve shaft 68 to sun gears 44, 52; the outer races of couplings 94, 92 are connected respectively to the drum 96, which is connected, to the transmission casing through operation of brake 90 and to brake 88.

The outer torsional member of reverse clutch 98 (RC) is connected to drum 96, and the inner member of the reverse clutch is directly connected to input shaft 32 and to the outer member of direct clutch 100 (DC). Carrier 48 of the second gear unit is selectively connected to input shaft 32 through direct clutch 100.

The torque converter includes a lockup clutch 102, located within the torque converter and impeller housing. The torque output side of the lockup clutch has a damper 104 located between the impeller and the turbine sleeve shaft 24 so that engagement of the lockup clutch will not be accompanied by harshness due to transitional torque fluctuations.

The inner race of a one-way or overrunning brake (OWC1) 106 is directly connected to carrier 48 and drum 60; the outer race of brake 106 is fixed permanently against rotation to the transmission casing. The inner race of one-way clutch 64 is connected to ring gear 38, and its outer race is connected to one element of forward clutch 62. One-way couplings 64, 92, 94 and one-way brake 106 are roller-type overrunning couplings generally having an outer cam with an inclined surface driveably connected to, and released from the inner race by a roller in accordance with the speed of rotation of the inner race relative to the outer race. Brake 110 (5B), a friction disc brake, holds carrier 56 against rotation by connecting it to the casing when the brake is engaged and releases carrier 56 when disengaged.

The inner race of one-way coupling 64 is also connected to an element of coast clutch 108 (CC), the other component of the coast clutch being connected to drum 60.

Friction elements 62, 88, 98, 100, 108, 110 are hydraulically actuated clutches and brakes of the type having multiple friction discs supported rotatably on one member of the friction element and a second set of friction discs interposed between the members of the first friction disc set and supported rotatably on the other member of the friction element. When hydraulic pressure is applied to the friction element, the discs are brought into mutual frictional contact and the friction element transmits torque between its members. When the magnitude of hydraulic pressure supplied to the friction elements is reduced, a spring disengages the discs and the friction element is thereafter unable to transmit torque.

Figure 6:
FIG. 6 is a chart that shows a schedule of engagement and disengagement of clutches, couplings and brakes and to establish the forward drive ratios and reverse drive of the transaxle of FIG. 1.

A low/reverse brake band 112 selectively engages drum 60 in low speed manual and reverse drive conditions. Brake bands 90, 112 are actuated by hydraulic servos, which contract the corresponding brake band into engagement with the respective drums 60, 96 and release this engagement when the corresponding servo is vented FIG. 6 shows a chart indicating the clutches and brakes that are engaged and released selectively to produce each of the various forward drive ratios and the reverse ratio. In the chart, the symbol X is used to identify an engaged clutch or brake, the symbol O/R is used to designate an overrunning condition for couplings or brakes 52, 84, 96, and a blank is used with respect to columns entitled "OWC1", "OWC2" and "OWC3" and "OWC4" to indicate a one-way coupling or brake that is neither overrunning nor driving.

In operation with the gear selector in the "D" or "OD" position, to establish automatically the lowest forward speed ratio, forward clutch 62 is applied, one-way clutch 64 drives, and one-way brake 106 drives. When the forward clutch is engaged, ring gear 38 is fixed to the transmission casing against rotation, thereby providing the gearset reaction. Engine torque then is transmitted hydrodynamically through the torque converter, and transfer drive chain 28 to sprocket wheel 30, input shaft 32, and sun gear 36. Carrier 40 of the first planetary gear unit drives output shaft 66, and the axle shafts 34, 36 are driven through final drive gear set 70 and differential unit 72. When operating in the D-range under a coast condition, one-way brake 106 and one-way clutch 64 overrun.

When first gear is selected manually by the operator by placing the gear shift lever in the 1M-range position, coast clutch 108 and low reverse band 112 are applied. The torque delivery path from ring gear 38 through the coast clutch shunts the torque path that includes one-way coupling 64 and forward clutch 62. Therefore, in the drive condition, there are two parallel paths potentially providing a gearset reaction on the transmission casing to hold ring gear 38 against rotation. One path is through one-way coupling 64 and forward clutch 62, and one-way brake 106; the other path is through coast clutch 108 and reverse band 102. However, in the coast condition, couplings 64 and 106 are inoperative, and the reaction on the transmission casing that holds ring gear 38 is provided through the coast clutch and the low/reverse band.

The torque delivery path for the second forward speed in the D-range results when forward clutch 62 and brake band 90 are applied, one-way couplings 64, 94 drive, and one-way brake 106 overruns. In this instance, sun gear 44 is held against rotation on the transmission casing by engagement of brake band 90. Torque from the engine is delivered to sun gear 36 and the output is taken at carrier 40, which is connected to output shaft 66. In the coast condition, all one-way couplings 64, 84 106 overrun; therefore, the output means comprising output shaft 66, carrier 40 and planet pinions 42 turn as a unit.

When the gear selector is set manually for operation in the 2M-range, coast clutch 108, forward clutch 62, friction brake 88 and brake band 90 are applied. During the drive condition in the 2M-range, one-way couplings 64, 94 drive and one-way brake 106 overruns. In this instance, sun gear 44 is fixed against rotation on the transmission housing by engagement of the brake band 90, and ring gear 38 is driveably connected to carrier 48 of the second planetary gear unit through either the torque delivery path that includes coast clutch 108 or the parallel path that includes one-way coupling 64 and forward clutch 62. In the coast condition in the 2M-range, one-way brake 106 overruns and one-way couplings 64 and 94 are inoperative. Sun gear 44 is fixed to the transmission casing against rotation by brake 88. Ring gear 38 is connected to carrier 48 of the first planetary gear unit through the path that includes coast clutch 108 and drum 60. Sun gear 36 drives input shaft 32.

When the transmission operates in the third forward speed and the gear selector is in the D-range, where gearshifts are produced automatically, forward clutch 62 and brake band 90 remain engaged, direct clutch 100 is engaged and one-way coupling 62 drives. Torque input from the engine is directed through the direct clutch and intermediate shaft 102, arranged concentrically with input shaft 32 and axle shaft 34, to carrier 48 of the second planetary gear unit. Carrier 48 drives ring gear 36 through drum 60, forward clutch 62 and one-way coupling 64. The torque output is taken by carrier 40 to output shaft 66.

During a coast condition in the third forward speed of the D-range, one-way couplings 64, 94, 106 overrun and torque from output shaft 66 is transmitted through carrier 48 to ring gear 46, which is driveably connected by overrunning coupling 64 to input shaft 32.

With the transmission operating in the 3M-range forward clutch 62, coast clutch 108, direct clutch 100 and brake band 90 are applied. During a drive condition in that range, one-way coupling 64 drives. With the friction elements so engaged, the engine shaft 12 is driveably connected through the torque converter and chain drive to the input shaft 32, which is connected through direct clutch 100 to intermediate shaft 114, which drives carrier 48, the input member of the second planetary gear unit. Carrier 48 is connected through forward clutch 62 and one-way clutch 64 to ring gear 38. The third speed ratio is a direct drive ratio; therefore, the output unit, ring gear 46, carrier 40 and output shaft 66, turn at the speed of carrier 48 and ring gear 38. During a coast condition in the 3M-range, one-way couplings 94, 106 overrun, and couplings 64, 92 are inoperative. Therefore, coast clutch 108 and drum 60 bypass the torque delivery path that includes forward clutch 62 and one-way coupling 64 to driveably connect ring gear 38 to carrier 48, thereby driving input shaft 32 at the speed of output shaft 66. Engagement of brake 82 assures that one-way coupling 94 overruns.

The fourth forward speed, an overdrive ratio, is available when the gear selector is in the D-range and 4M-range positions. To produce the fourth speed ratio in the D-range, brake band 88, forward clutch 62 and direct clutch 100 are applied, one-way coupling 64 and 106 overrun, one-way coupling 94 is inoperative and coupling 92 drives. Consequently, the engine shaft is connected through the torque converter, chain drive mechanism, input shaft 32, direct clutch 100 and intermediate shaft 114 to carrier 48, the input to the planetary gearing. Sun gear 44 is fixed against rotation on the transmission housing by engagement of friction brake 88. The output is ring gear 46, carrier 40 and output shaft 66, whose speed of rotation is multiplied through this arrangement in the second planetary gear unit only. The first gear unit is inoperative, although forward clutch 62 is engaged, because one-way coupling 64 overruns. Engagement of brake band 90 assures that one-way coupling 94 overruns in the drive condition.

During the fourth speed coast condition in the D-range, one-way couplings 64, 92, 106 overrun. Sun gear 44 is held against rotation by brake 88, and shaft 66 drives carrier 40 and ring gear 46. Carrier 48 is driveably connected to the sprocket wheel 30 of the chain drive mechanism through intermediate shaft 114, direct clutch 100 and input shaft 32.

During operation in the 4M-range, brake 88, direct clutch 100, and forward clutch 62 are engaged. Couplings 64, 106 overrun but coupling 92 drives. Consequently, under drive conditions, sun gear 44 produces the gearset reaction because it is held on the casing through coupling 92 by engagement of brake 88. Carrier 48 is driven, but because coupling 64 overruns, the output is taken at ring gear 46, carrier 40 and shaft 62.

Under coast conditions in the 4M-range, shaft 66 drives carrier 40 and ring gear 46, but sun gear 44 is held against rotation by brake 88. Consequently carrier 48 drives intermediate shaft 114, which is connected to the engine through shaft 32, the direct clutch, and the chain drive mechanism.

The fifth speed is available only with the gear selector in the D-range. Fifth speed results when brakes 88 and 90, the direct clutch, and forward clutch are engaged. This causes couplings 64, 92, 106 to overrun and holds carrier 56 against rotation. Input shaft 66 drives carrier 48 and ring gear 54 through the direct clutch and intermediate shaft. Planet pinions 58 counterdrive sun gear 52 and drum 56 through coupling 94 because carrier 58 held. Torque carried by compound sun gears 52 and 44 combine in the second gear unit to drive planet pinions 58, which also revolve due to the connection of carrier 48 to the input shaft. Ring gear 46, which is driven by carrier 48 and pinions 58, is connected to the output shaft by carrier 40. Ring gear 38 and the inner race of coupling 64 overrun.

When the transmission is disposed for reverse drive operation, input shaft 32 is driveably connected through reverse clutch 98, drum 96, one-way coupling 94 and sleeve shaft 68 to compound sun gears 52 and 44, the input to the second planetary gear unit. Carrier 48 is fixed against rotation through engagement of low-/reverse brake band 112. As a result of this engagement, ring gear 46 is counterrotated and the output is taken on carrier 40 and output shaft 66. During the coast condition in the R-range, coupling 94 overruns, thereby driveably disconnecting sun gears 44 and 52 from input shaft 32 and from the engine.

Having described a preferred embodiment of my invention, what I claim and desire to secure by U.S. Letters Patent is:

1. A multiple speed automatic transaxle for an automotive vehicle having a power source for driving a load, comprising:
   input means for carrying torque between the power source and a planetary gear system;
   output means for carrying torque between the planetary gear system and the load;
   a planetary gear system comprising first, second and third planetary gear units, each gear unit having a sun gear, a ring gear, planet pinions meshing with the sun gear and ring gear, and a carrier rotatably supporting the planet pinions, the sun gears of the second and third gear units being connected mutually, the carrier of the second gear unit being connectable to the ring gear of the first gear unit and permanently connected to the ring gear of the third gear unit, the input means being connected to the sun gear of the first gear unit, the output means being connected to the ring gear of the second gear unit and to the carrier of the first gear unit;
   first clutch means for delivering torque between the ring gear of the first gear unit and the carrier of the second gear unit, including a first overrunning coupling (64) and a first friction clutch (62) disposed in series with the first overrunning coupling;
   first overrunning brake means (106) for holding the carrier of the first gear unit and ring gear of the third gear unit against rotation in one rotary direction and releasing said carrier and said ring gear in the opposite rotary direction;
   second clutch means (100) for delivering torque between the input means and the carrier of the second gear unit;
   third clutch means for delivering torque between said input means and the sun gears of said second and third gear units, comprising a second overrunning coupling (94) and a third friction clutch (98) disposed in series with the second overrunning coupling;
   first brake means (90) for releasably holding the sun gears of the second and third gear units against rotation;
   second brake means (112) for releasably holding the carrier of the second gear unit against rotation;
   first overdrive brake means for holding against rotation and releasing the sun gears of the second and third gear units including a first friction brake (88) having an output fixed to the transmission casing and an input, second overrunning coupling (92) for producing a one-way drive connection between the sun gears of the second and third gear units and the input of the first friction brake;
   second overdrive brake means (110) for holding against rotation and releasing the carrier of the third gear unit; and
   coast clutch means (108) disposed in parallel with the first clutch means between the ring gear of the first gear unit and the first overrunning brake means for delivering torque between the ring gear of the first gear unit and the carrier of the second gear unit.

2. The transaxle of claim 1 further comprising:
   a hydrokinetic torque converter having an impeller driveably connected to the power source; and
   a turbine hydrokinetically coupled to the impeller and driveably connected to the input means.

3. The transaxle of claim 1 wherein the output means further comprises final drive gearing driveably connecting the output of the planetary gear system and the load.

4. The transaxle of claim 1 further comprising:
   a hydrokinetic torque converter having an impeller driveably connected to the power source;
   a turbine hydrokinetically coupled to the impeller and driveably connected to the input means; and final drive gearing driveably connecting the output of the planetary gear system and the load.

5. The transaxle of claim 2 wherein said transaxle includes a torque transfer drive comprising a drive sprocket connected to said turbine, a driven sprocket connected to said clutch sleeve shaft and a drive chain driveably connecting said drive and driven sprockets.

6. A multiple speed automatic transaxle for an automotive vehicle having a power source for driving a load, comprising:

input means for carrying torque between the power source and a planetary gear system;

output means for carrying torque between the planetary gear system and the load;

a planetary gear system comprising first, second and third planetary gear units, each gear unit having a sun gear, a ring gear, planet pinions meshing with the sun gear and ring gear, and a carrier rotatably supporting the planet pinions, the sun gears of the second and third gear units being connected mutually, the carrier of the second gear unit being connectable to the ring gear of the first gear unit and permanently connected to the ring gear of the third gear unit, the input means being connected to the sun gear of the first gear unit, the output means being connected to the ring gear of the second gear unit and to the carrier of the first gear unit;

first means for driveably connecting and releasing the carrier of the second gear unit and the ring gear of the first gear unit, including a first drum driveably connected to the carrier of the second gear unit and the ring gear of the third gear unit; a first overrunning coupling (64) and a first friction clutch (62) disposed in series with the first overrunning coupling, located between the first drum and the ring gear of the first gear unit; coast clutch means (108) disposed in parallel with the first friction clutch and the first overrunning coupling between the first drum and the ring gear of the first gear unit; overrunning brake means (106) for holding the first drum against rotation in one rotary direction and releasing said drum in the opposite rotary direction; and low/reverse brake means (112) for releasably holding the first drum against rotation;

second means for driveably connecting the input means and the sun gears of the second and third gear units, including a second drum; second overrunning coupling (94) for producing a one-way drive connection between the second drum and the sun gears of the second and third gear units; a second friction clutch (100) for releasably connecting the input means and the carrier of the second gear unit; a third friction clutch (98) releasably connecting the input means and the second drum; and brake means (90) for releasably holding the second drum against rotation; and overdrive brake means (88) for holding against rotation and releasing the sun gears of the second and third gear units.

7. The transaxle of claim 6 further comprising:

a hydrokinetic torque converter having an impeller driveably connected to the power source; and a turbine hydrokinetically coupled to the impeller and driveably connected to the input means.

8. The transaxle of claim 6 wherein the output means further comprises final drive gearing driveably connecting the output of the planetary gear system and the load.

9. The transaxle of claim 6 further comprising:

a hydrokinetic torque converter having an impeller driveably connected to the power source;

a turbine hydrokinetically coupled to the impeller and driveably connected to the input means; and final drive gearing driveably connecting the output of the planetary gear system and the load.

10. The transaxle of claim 6 wherein said transaxle includes a torque transfer drive comprising a drive sprocket connected to said turbine, a driven sprocket connected to said clutch sleeve shaft and a drive chain driveably connecting said drive and driven sprockets.

11. The transaxle of claim 7 wherein said transaxle includes a torque transfer drive comprising a drive sprocket connected to said turbine, a driven sprocket connected to said clutch sleeve shaft and a drive chain driveably connecting said drive and driven sprockets.

12. In a multiple speed automatic transaxle for an automotive vehicle having a power source for driving a load, the combination comprising:

input means for carrying torque between the power source and a planetary gear system;

a planetary gear system comprising first, second and third planetary gear units, each gear unit having a sun gear, a ring gear, planet pinions meshing with the sun gear and ring gear, and a carrier rotatably supporting the planet pinions, the sun gears of the second and third gear units being connected mutually, the carrier of the second gear unit being connectable to the ring gear of the first gear unit and permanently connected to the ring gear of the third gear unit, the input means being connected to the sun gear of the first gear unit;

first clutch means for delivering torque between the ring gear of the first gear unit and the carrier of the second gear unit, including a first overrunning coupling (64) and a first friction clutch (62) disposed in series with the first overrunning coupling;

first overrunning brake means (106) for holding the carrier of the second gear unit and ring gear of the third gear unit against rotation in one rotary direction and releasing said carrier and said ring gear in the opposite rotary direction; and coast clutch means (108) disposed in parallel with the first clutch means between the ring gear of the first gear unit and the first overrunning brake means for delivering torque between the ring gear of the first gear unit and the carrier of the first gear unit.

13. The transaxle of claim 12 further comprising second clutch means (112) for delivering torque between the input means and the carrier of the first gear unit.

14. In a multiple speed automatic transaxle for an automotive vehicle having a power source for driving a load, the combination comprising:

input means for carrying torque between the power source and a planetary gear system;

a planetary gear system comprising first, second and third planetary gear units, each gear unit having a sun gear, a ring gear, planet pinions meshing with the sun gear and ring gear, and a carrier rotatably supporting the planet pinions, the sun gears of the second and third gear units being connected mutually, the carrier of the second gear unit being connectable to the ring gear of the first gear unit and permanently connected to the ring gear of the third gear unit, the input means being connected to the sun gear of the first gear unit;

first brake means for holding against rotation and releasing the sun gears of the second and third gear units including a first friction brake means (88) having an output fixed to a transmission casing and an input, and a first overrunning coupling means (92) for producing a one-way drive connection between the sun gears of the second and third gear units and the input of the first friction brake; and second brake means (88) for holding against rotation and releasing the sun gears of the second and third gear units including second overrunning coupling means (94) for producing a one-way drive connection to the sun gears of the second and third gear units, and a second friction brake means (90) for holding against rotation and releasing the second overrunning coupling means, the sun gears of the second and third gear units and the first and second overrunning coupling means being connected mutually.

15. The transaxle of claim 14 further comprising:

first clutch means (100) for delivering torque between the input means and the carrier of the second gear unit; and second clutch means for delivering torque between said input means and the sun gears of said second and third gear units. comprising a friction clutch (98) disposed in series with the second overrunning coupling means.

* * * * *